United States Patent [19]
Kinney

[11] 3,791,512
[45] Feb. 12, 1974

[54] METHOD AND APPARATUS FOR ORIENTING ELEMENTS

[75] Inventor: Alfred W. Kinney, Kansas City, Mo.

[73] Assignee: Phillips Petroleum Company, Bartlesville, Okla.

[22] Filed: Nov. 15, 1971

[21] Appl. No.: 198,646

[52] U.S. Cl.......................... 198/33 AA, 198/33 AD
[51] Int. Cl............................................. B65g 47/24
[58] Field of Search198/33 R, 33 AA; 221/157, 158; 198/229

[56] References Cited
UNITED STATES PATENTS

| | | | |
|---|---|---|---|
| 3,556,282 | 1/1971 | Moeltzner | 198/33 AA |
| 2,625,313 | 1/1953 | Resina | 198/33 R |
| 3,525,167 | 8/1970 | French | 198/229 |
| 2,609,912 | 9/1952 | Engel | 198/33 AA |
| 3,526,311 | 9/1970 | Robinson | 198/33 AD |

FOREIGN PATENTS OR APPLICATIONS
453,052  11/1927  Germany ........................... 221/158

Primary Examiner—Richard E. Aegerter

[57] ABSTRACT

A method and apparatus for positioning concave articles on an upwardly moving elevator with the articles resting on a side portion thereof, moving the articles upwardly with the elevator, contacting a portion of the articles with a rotating protrusion extending through the elevator, moving the articles from the elevator to one of first or second locations, and commonly orienting the articles at one of first or second locations.

14 Claims, 5 Drawing Figures

PATENTED FEB 12 1974

3,791,512

SHEET 1 OF 2

INVENTOR.
A.W. KINNEY

BY Young & Quigg

ATTORNEYS

METHOD AND APPARATUS FOR ORIENTING ELEMENTS

It is desirable to provide an apparatus for removing concave articles, such as lids having sidewall portions, from a concave article bulk source where said articles reside in random orientation and delivering said lids to a preselected location in commonly oriented positions. By the term lids used herein it is meant any article having side portions and a top portion defining an article having at least one concave portion.

In summary, this invention therefore resides in a method and apparatus for positioning the lids on an upright conveyor or elevator with the lids resting on a side portion of said lids, moving the lids upwardly with the elevator, contacting a portion of the lids with a rotating protrusion extending through the conveyor, moving the lids from the conveyor to one of first or second locations, and commonly orienting the lids at one of first or second locations.

Other aspects, objects, and advantages of the present invention will become apparent from a study of the disclosure, the appended claims, and the drawings.

Figure 1:
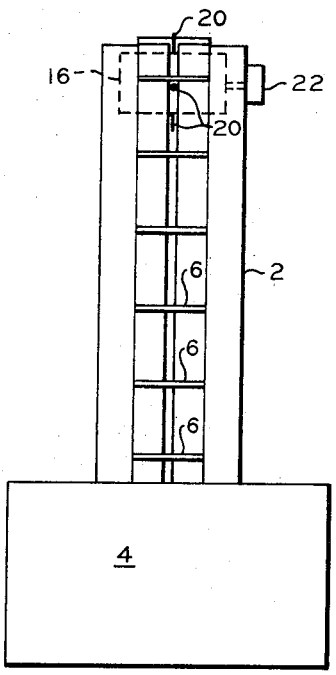
Figure 3:
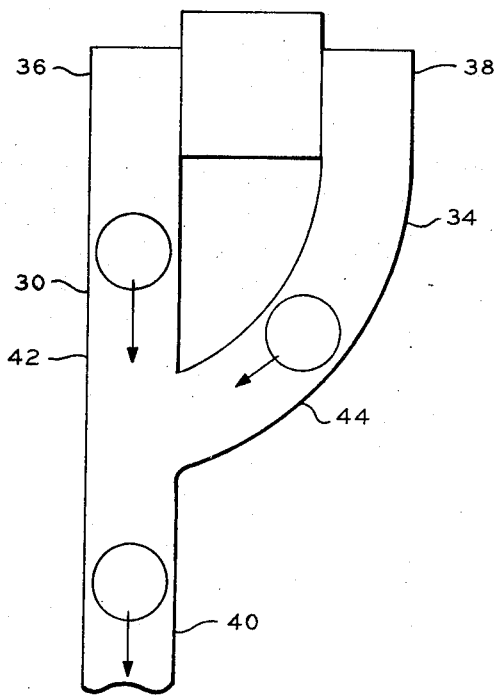
Figure 4:
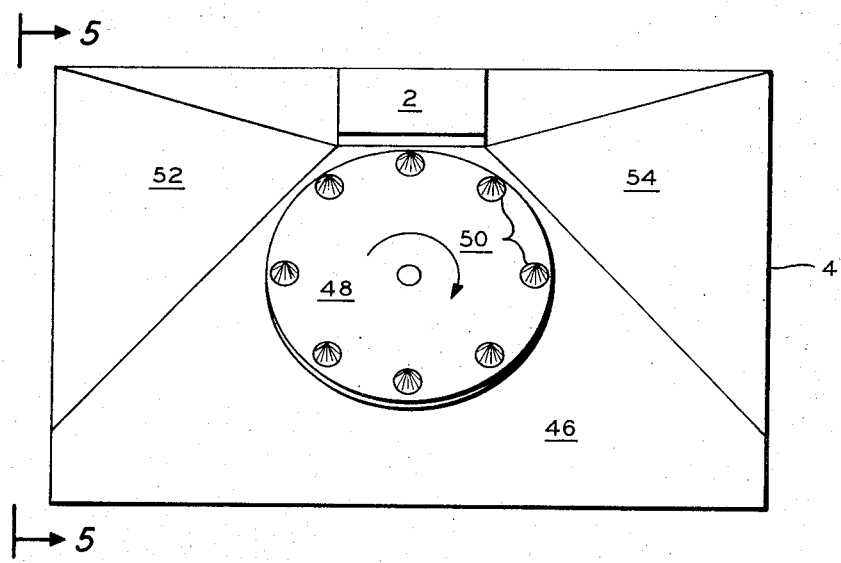
Figure 5:
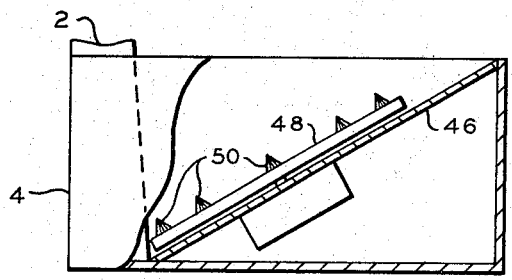

The drawings are diagrammatic views of the apparatus of this invention. FIG. 1 is a portion of the apparatus with the first and second chutes removed, FIG. 2 shows a view of the upper portion of the elevator with portions of the chutes cut away, FIG. 3 shows a plan view of the apparatus with the hopper removed, FIG. 4 shows a plan view of the hopper, and FIG. 5 shows a side view of the hopper in partial section.

Figure 2:
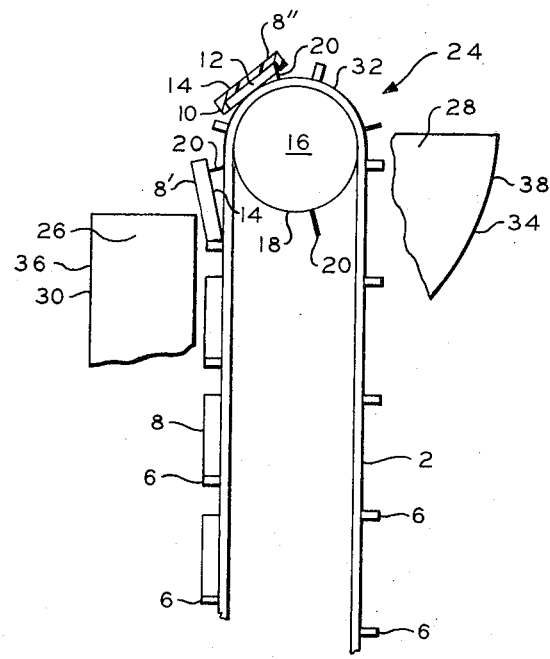

Referring to FIGS. 1 and 2, an elevator 2 extends upwardly from within an article hopper 4. The elevator 2 has spaced-apart cross members 6 positioned along its length for receiving and supporting the lids 8 and moving said lids 8 upwardly. The cross members 6 are of dimensions adapted to receive and maintain a lid 8 with said lid 8 resting on a side portion 10 thereof. A lid 8 resting on one of the cross members is oriented relative to the elevator 2 with its concave portion 12 directed toward or from the elevator 2.

Where the article or lids 8 are ice cream caps, for example, the top 14 and side portions 10 of the lid define the concave portion 12. The lid 8 can however be of other configuration so long as, in the position of the lid resting on its side portion 10, the top 14 defining the concave portion is spaced a closer distance to one edge of the lid than the other. One example would be a lid having two concave portions and being of an H configuration and cross section.

The cross members 6 are spaced one from the other a distance in the range of about 2 to about 1 times the diameter or largest dimension of the top 14 of the article of lid 8 carried by the elevator 2, preferably about 1⅓ times. At distances less than about 1⅓ times the dimension of the top 14, the lids 8 are not effectively fed into the elevator and dimensions greater than about 2 times the dimension of the top 14 result in jamming of the articles, waste of elevator space, materials, and the operating speed of the apparatus is reduced which results in further obvious wastes.

In order to assure that the lids 8 remain on their cross member 6 during upward movement thereby, it is preferred that the elevator be inclined at an angle in the range of about 5° to about 15° relative to the vertical in a direction whereby gravity urges the lids 8 resting on the cross members 6 toward the elevator 2. At angles less than about 5°, the lids 8 are more prone to be displaced from the elevator by vibrational forces and at angles greater than about 15°, the lids 8 are sufficiently difficult to orient as to cause undesirable malfunctions of the apparatus.

A selector drum 16 has an outer surface 18 and at least one protrusion 20, preferably a plurality of protrusions, extending radially outward from the outer surface 18. The drum 16 is operably connected to a power source 22 for rotation of the drum and is positioned adjacent an upper end portion 24 of the elevator 2. The protrusions 20 are of a length sufficient for extending through the elevator 2 to a location a preselected distance beyond the elevator 2 for contacting and moving the lids 8 from the elevator 2 to a commonly oriented position at a first location 26, in response to the orientation of the lid 8 on the elevator 2 when its concave portion is oriented in a direction from the elevator 2.

A lid 8' having its concave portion 12 oriented in a direction from the elevator 2 has its top 14 contacted by one of the protrusions 20 during the rotation thereof which causes said lid 8' to flip over and come to rest at the first location 26 on the first chute 30 with the concave portion 12 of the lid 8' directed downwardly. Protrusions 20 preferably are of insufficient length so that a lid 8'' having its concave portion 12 oriented in a direction toward the elevator 2 is not contacted by one of the protrusions 20 during the rotation thereof and said lid 8'' is pushed by the cross member 6 over the upper end 32 of the elevator and deposited at the second location 28 on the second chute with the concave portion 12 of the lid 8'' also directed downwardly. In another embodiment, the protrusion 20 can be of a length for contacting the side portion 10 and pulling the lid 8'' over said upper end 32.

Referring to FIGS. 2 and 3, the first chute 30 has a first end portion 36 positioned at the first location 26 and extending outwardly therefrom and the second chute 34 has a first end portion 38 positioned at the second location 28 and extending outwardly therefrom. A third chute 40 can be connected to the second end 42,44 of the first and second chutes 30, 34 for receiving lids 8', 8''.therefrom and directing said lids to a preselected location such as for example a capping machine. The third chute 40 can also have apparatus (not shown) associated therewith for divering any excess lids resting on the third chute 40 back to said hopper 4. This diverting apparatus is a safety feature which effectively handles excess lids when the capping machine has malfunctioned, for example.

Referring to FIGS. 4 and 5, in order to provide a hopper 4 of a configuration which reduces the amount of jamming and bridging of disoriented lids 8 therein while feeding the lids 8 toward the elevator 2 for deposit thereon, the bottom 46 of the hopper is positioned in the hopper at an angle relative to the horizontal in the range of about 30° to about 45° and extending downwardly toward the elevator 2. At angles less than about 30°, the lids 8 are not effectively moved by gravity toward the elevator and at angles greater than about 45°, the amount of interlocking, bridging, and feeding malfunctions are increased owing to the weight of the overlying lids 8 and the lid direction change that must be effected.

In order to further assure against bridging, interlocking, and other feeding malfunctions, it is preferred that an unscrambling rotatable element 48 having protrusions 50 extending outwardly into the hopper 4 form at least a portion of the hopper bottom 46 and said element 48 be rotatable for moving the protrusions 50 within the hopper 4. The protrusions 50 are preferably spaced apart and may be of conical configuration for protecting the lids 8 against damage during contact with the protrusions 50.

In order to further assure effective feed of lids 8 to the elevator 2, it is preferred that first and second side elements 52, 54 be angularly positioned in the hopper 4 relative to the elevator 2 with one end of said element 52, 54 being adjacent the elevator 2 on opposed sides thereof with each of said elements 52, 54 extending angularly outwardly in the hopper 4 from the elevator 2.

In the preferred method of this invention, lids 8 in the hopper 4 are positioned on the cross member 6 with the concave portion of some lids oriented in a direction from the elevator and some lids with their concave portion oriented in a direction toward the elevator as set forth above and moved upwardly in response to the upward movement of the elevator 2. At the upper portion 24 of the elevator 2, a drum protrusion 20 contacts the lid 8 with the concave portion oriented in a direction from the elevator and moves the lid from the elevator to a first location 26, and commonly orients the lids 8 at said location 26. Lids with their concave portion oriented toward the elevator are pushed by the cross member 6 over the top of the elevator 2 to the second location 28 where the lids are commonly oriented with the lids at the first location 26. The side elements 52, 54 cause the lids to be directed toward the elevator 2 and the unscrambling element 48 continuously moves at least a portion of the lids 8 in the hopper 4 adjacent the elevator 2 for assuring proper feeding of the lids to the elevator 2.

The power source connected to the elevator 2, unscrambling element 48, and drum 16 can be a single power source or separate power sources as is known in the art.

Other modifications and alterations of this invention will become apparent to those skilled in the art from the foregoing discussion and accompanying drawings, and it should be understood that this invention is not to be unduly limited thereto.

What is claimed is:

1. Apparatus for recovering articles having a concave portion defined by a top and a side portion from a concave article bulk source, orienting said articles with the top of said articles uppermost and delivering said oriented articles to a preselected location, comprising:

an article hopper;
first means for receiving and maintaining individual articles such resting on their side portion and moving said articles upwardly, said first means comprising an elevator extending upwardly from the hopper;
means for contacting and moving articles from the elevator to a commonly oriented position at one of first or second locations in response to the orientation of the article on the elevator, said articles having their concave portions directed toward the elevator being contacted, lifted over the elevator, and deposited at the second location, and said articles having their concave portions directed outwardly from the elevator being contacted, moved outwardly from the elevator, and deposited at the first location, said means comprising a selector drum having an outer surface and at least one protrusion extending radially outwardly therefrom, said drum being rotatably mounted adjacent an upper end portion of the elevator and said protrusion having a length sufficient for extending through the elevator to a location a preselected distance beyond the elevator during rotation of the drum for contacting and moving articles from the elevator;
second means positioned at the first location for receiving one portion of the articles from the elevator and directing said articles to the preselected location; and
third means positioned at the second location for receiving the remaining portion of the articles from the elevator and directing said articles to the preselected location.

2. An apparatus, as set forth in claim 1, including an unscrambling element having protrusions extending outwardly therefrom, said uncrambling element being angularly positioned in the hopper relative to the elevator and rotatable for moving the protrusions within the hopper.

3. An apparatus, as set forth in claim 2, wherein the unscrambling element is positioned in the hopper at an angle relative to the horizontal in the range of about 30° to about 45°.

4. An apparatus, as set forth in claim 2, wherein the protrusions of the unscrambling element are of conical configuration and are spaced on the unscrambling element one from the other.

5. An apparatus, as set forth in claim 1, including side elements being angularly positioned in the hopper relative to the elevator with one end of each element being adjacent the elevator on opposed sides thereof with each of said elements extending angularly outwardly in the hopper from the elevator.

6. An apparatus, as set forth in claim 1, wherein the elevator has spaced apart cross members along its length for supporting the articles thereon, said cross members being spaced one from the other a distance in the range of about 2 to about 1 times the diameter of the top of the article carried by said elevator.

7. An apparatus, as set forth in claim 1, wherein the elevator is inclined at an angle in the range of about 5° to about 15° relative to the vertical.

8. An apparatus, as set forth in claim 1, including a third chute connected to the first and second means and being adapted to receive commonly oriented articles from said first and second means chutes.

9. A method for recovering articles having a concave portion defined by a top and a side portion from an article bulk source, orienting said articles with the top of said articles aligned in a preselected direction and delivering said oriented articles to a preselected location, comprising:

positioning said articles on an upwardly moving elevator with said articles having a side portion resting on the elevator;
moving the articles upwardly in response to movement of the elevator;
rotating a protrusion of a selector drum through a portion of the elevator and over a top of the elevator;
contacting the top of articles having their concave portions oriented in a direction from the elevator with the protrusion, moving the articles outwardly from the conveyor to a first location in response to the orientation of the article on the elevator and the contacting of the top of the article by the protrusion, and commonly orienting the articles at the first location, and contacting a side portion of articles with their concave portions oriented in a direction toward the elevator, moving said articles over the top of the elevator to a second location in response to the orientation of the article on the elevator and the contacting of the side portion of the article by the protrusion, and commonly orienting the article at said second location; and moving the commonly oriented articles from the first and second locations to a preselected location while maintaining said articles commonly oriented.

10. An apparatus, as set forth in claim 1, including an unscrambling element having generally conical, spaced-apart protrusions extending outwardly therefrom, said element being positioned in the hopper at an angle relative to the horizontal in the range of about 30° to about 45° and extending downwardly toward the elevator and being rotatable and wherein the elevator has spaced-apart cross members along its length for supporting the articles thereon, said cross members being spaced one from the other a distance in the range of about 2 to about 1 times the diameter of the top of the article carried by said elevator and wherein said elevator is inclined at an angle in the range of about 5° to about 15° relative to the vertical, and including side elements being angularly positioned in the hopper relative to the elevator with one end of each element being adjacent the elevator on opposed sides thereof with each of said elements extending angularly outwardly in the hopper from the elevator.

11. A method, as set forth in claim 9, including continuously moving at least a portion of the articles of the article bulk source at a location adjacent the elevator.

12. A method, as set forth in claim 9, including directing the articles of the article bulk source in a direction toward the elevator.

13. A method, as set forth in claim 10, wherein the articles are moved upwardly in response to movement of the elevator at an angle in the range of about 5° to about 15° relative to the vertical.

14. A method, as set forth in claim 13, including continuously moving at least a portion of the articles of the article bulk source at a location adjacent the elevator, directing the articles of the article bulk source in a direction toward the elevator, and slidably moving the articles from the first and second locations to the preselected location.

* * * * *

UNITED STATES PATENT OFFICE
CERTIFICATE OF CORRECTION

Patent No. 3,791,512                          Dated: February 12, 1974

Alfred W. Kinney

It is certified that error appears in the above-identified patent and that said Letters Patent are hereby corrected as shown below:

Column 3, line 53, delete "such" and insert therefor --- each ---; and column 4, line 49, delete "chutes".

Signed and sealed this 2nd day of July 1974.

(SEAL)
Attest:

EDWARD M. FLETCHER,JR.         C.MARSHALL DANN
Attesting Officer                   Commissioner of Patents